(12) United States Patent
Ramesh et al.

(10) Patent No.: US 11,995,036 B2
(45) Date of Patent: May 28, 2024

(54) AUTOMATED CUSTOMIZED MODELING OF DATASETS WITH INTUITIVE USER INTERFACES

(71) Applicant: Ikigai Labs Inc., San Francisco, CA (US)

(72) Inventors: Vinayak Ramesh, El Dorado Hills, CA (US); Devavrat Shah, Newton, MA (US)

(73) Assignee: Ikigai Labs Inc., San Francisco, CA (US)

( * ) Notice: Subject to any disclaimer, the term of this patent is extended or adjusted under 35 U.S.C. 154(b) by 283 days.

(21) Appl. No.: 17/069,176

(22) Filed: Oct. 13, 2020

(65) Prior Publication Data

US 2021/0109894 A1    Apr. 15, 2021

Related U.S. Application Data

(60) Provisional application No. 62/913,968, filed on Oct. 11, 2019.

(51) Int. Cl.
*G06F 16/16* (2019.01)
*G06F 3/04817* (2022.01)
(Continued)

(52) U.S. Cl.
CPC ........ *G06F 16/168* (2019.01); *G06F 3/04817* (2013.01); *G06F 9/453* (2018.02); *G06F 40/18* (2020.01)

(58) Field of Classification Search
CPC ........ G06N 5/022; G06N 7/005; G06N 20/00; G06K 9/6224; G06K 9/6256; G06K 9/6269; G06K 9/6229; G06Q 10/04; G05B 13/048; G06F 3/0484; G06F 3/04812; G06F 3/0482; G06F 3/0488; G06F 3/0485; G06F 16/168; G06F 9/453; G06F 40/18; G06F 3/04817

See application file for complete search history.

(56) References Cited

U.S. PATENT DOCUMENTS

| | | | |
|---|---|---|---|
| 6,477,665 B1 * | 11/2002 | Bowman-Amuah | G06F 11/22 714/39 |
| 8,176,471 B2 * | 5/2012 | Novacek | G06F 8/34 717/109 |

(Continued)

FOREIGN PATENT DOCUMENTS

| | | | | |
|---|---|---|---|---|
| AU | 2013270490 A1 * | 7/2014 | | F01M 11/10 |
| CA | 2634020 A1 * | 11/2009 | | G06F 17/30873 |

(Continued)

*Primary Examiner* — Steven P Sax
(74) *Attorney, Agent, or Firm* — Intrinsic Law Corp.

(57) ABSTRACT

A computer-implemented method for automatically determining data relationships includes generating a graphical user interface (GUI) that allows a user to intuitively form a customized model of data from different data sources. The GUI includes icons that represent data sources, data variable selection, data modeling, and data prediction. The icons can be logically arranged to form a customized model without any additional user input or knowledge of data modeling. A prediction GUI allows the user to set customized weights of data variables in the model to form predictive controls for data prediction such as in what-if scenarios.

6 Claims, 14 Drawing Sheets

(51) Int. Cl.
*G06F 9/451* (2018.01)
*G06F 40/18* (2020.01)

(56) References Cited

U.S. PATENT DOCUMENTS

| | | | |
|---|---|---|---|
| 9,111,212 B2 * | 8/2015 | Jones | G06F 30/20 |
| 10,217,169 B2 * | 2/2019 | Schumann, Jr. | |
| | | | G08G 1/096775 |
| 10,565,038 B1 | 2/2020 | Shah et al. | |
| 10,769,528 B1 * | 9/2020 | Wang | G06N 3/08 |
| 10,783,998 B1 * | 9/2020 | Perlin | G16H 15/00 |
| 10,817,791 B1 * | 10/2020 | Shoemaker | G06F 21/316 |
| 10,885,099 B1 * | 1/2021 | Price | G06N 3/04 |
| 10,914,698 B2 * | 2/2021 | Potyrailo | G01N 33/1893 |
| 10,943,301 B1 * | 3/2021 | Wu | G06F 17/18 |
| 11,392,855 B1 * | 7/2022 | Murakonda | G06N 20/00 |
| 11,410,243 B2 * | 8/2022 | Rabinowitz | G06Q 10/067 |
| 11,526,521 B2 * | 12/2022 | Diaz | G06F 16/24578 |
| 2007/0079223 A1 * | 4/2007 | Mondin | H03M 13/3746 |
| | | | 714/780 |
| 2008/0154821 A1 * | 6/2008 | Poulin | G06Q 10/0631 |
| | | | 706/21 |
| 2010/0146396 A1 * | 6/2010 | Able | G06F 16/95 |
| | | | 715/735 |
| 2013/0292461 A1 * | 11/2013 | Plutt | G11B 15/6835 |
| | | | 235/375 |
| 2014/0245207 A1 * | 8/2014 | Poulin | G06N 5/022 |
| | | | 715/771 |
| 2016/0140452 A1 * | 5/2016 | Garcia Sedano | G06N 20/00 |
| | | | 706/12 |
| 2017/0270435 A1 * | 9/2017 | Gallardo | G06Q 40/08 |
| 2018/0137219 A1 * | 5/2018 | Goldfarb | G06N 3/126 |
| 2019/0156600 A1 * | 5/2019 | Potyrailo | G07C 5/0816 |
| 2019/0260879 A1 * | 8/2019 | Raleigh | H04M 15/83 |
| 2019/0339688 A1 * | 11/2019 | Cella | G05B 23/0229 |
| 2020/0104457 A1 * | 4/2020 | Chuang | G06F 30/327 |
| 2020/0113479 A1 * | 4/2020 | Baricevic | A61B 5/0537 |
| 2020/0206405 A1 * | 7/2020 | Wyeth | A61M 1/3639 |
| 2021/0019321 A1 * | 1/2021 | Ehrlich | G06N 20/00 |
| 2021/0049532 A1 * | 2/2021 | Smith | G06Q 10/06315 |

FOREIGN PATENT DOCUMENTS

| | | | | | |
|---|---|---|---|---|---|
| CA | 2390895 C | * | 5/2012 | | G05B 9/02 |
| CA | 2919608 A1 | * | 2/2014 | | G01D 5/142 |
| CA | 2905503 A1 | * | 9/2014 | | G08G 1/012 |
| CA | 3050005 A1 | * | 7/2018 | | G06F 40/30 |
| CA | 3064771 A1 | * | 12/2018 | | G06F 11/3684 |
| CA | 3066775 A1 | * | 4/2019 | | G01G 19/393 |
| CN | 108536652 A | * | 9/2018 | | |
| CN | 110288142 A | * | 9/2019 | | G06F 16/215 |
| CN | 110688585 A | * | 1/2020 | | G06F 16/9536 |
| CN | 114711763 A | * | 7/2022 | | A61B 5/0022 |
| CN | 110363349 B | * | 8/2022 | | G06N 3/006 |
| FR | 3005368 A1 | * | 11/2014 | | G06T 11/206 |
| TW | 201032009 A | * | 9/2010 | | G05B 13/048 |

* cited by examiner

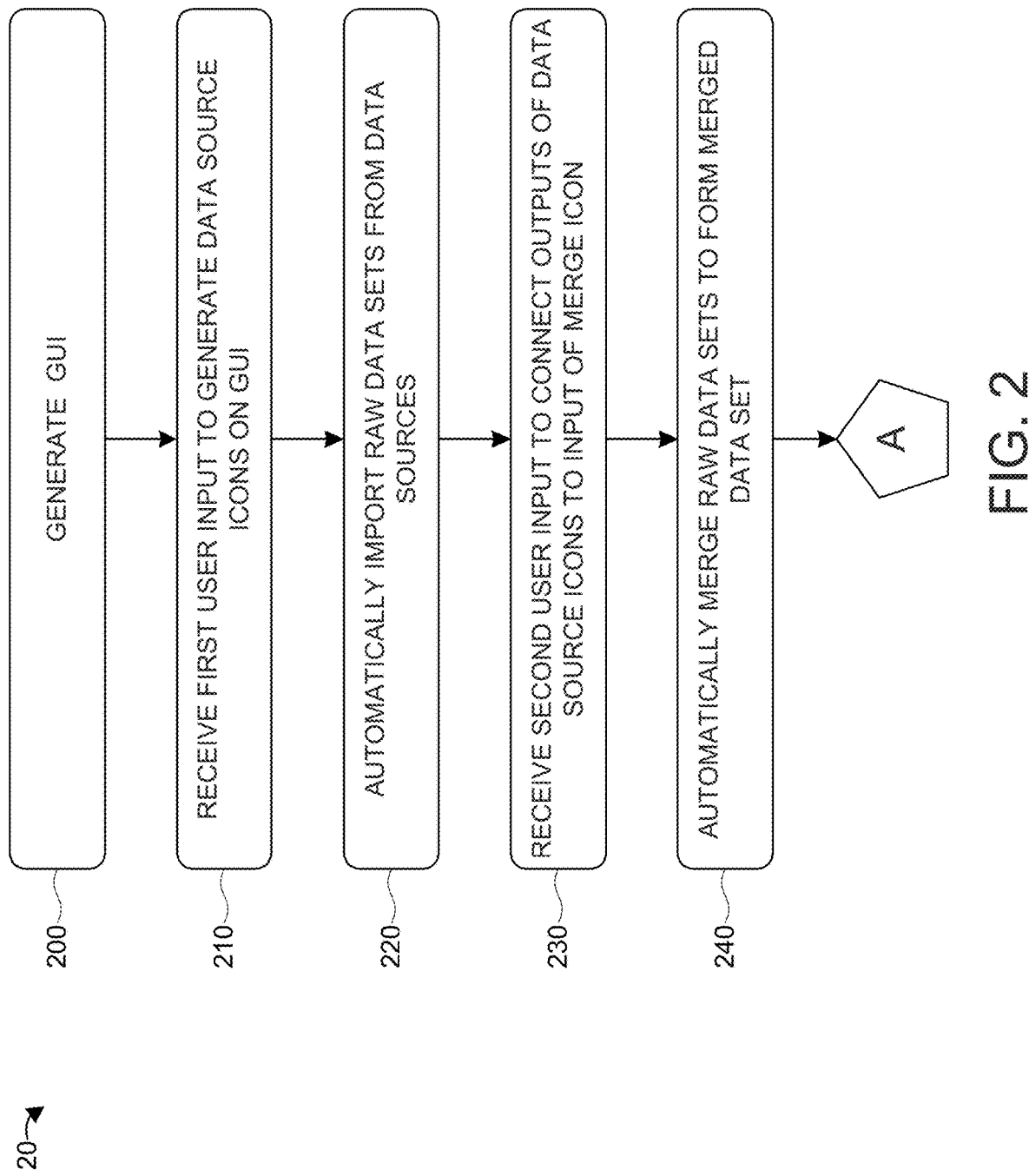

AUTOMATED CUSTOMIZED MODELING OF DATASETS WITH INTUITIVE USER INTERFACES

CROSS-REFERENCE TO RELATED APPLICATIONS

This application claims priority to U.S. Provisional Application No. 62/913,968, titled "Automated Predictive Modeling and Processing of Datasets with Intuitive User Interfaces," filed on Oct. 11, 2019, which is hereby incorporated by reference.

TECHNICAL FIELD

This application relates generally to automated systems for predictive modeling and/or processing of datasets.

BACKGROUND

Data analytics is becoming increasingly important for the conduct of commerce in almost every field. Current systems are not capable of extrapolating a dataset based on different scenarios, such as a change in a variable. In addition, current systems do not have intuitive interfaces that provide sophisticated data analysis, manipulation, and processing with minimal user input.

Many businesses also rely on data processing for their business models. For example, insurance companies rely on data processing for intaking new clients, processing claims, and analyzing data to determine insurance rates. However, some of this data is provided in forms that are not logically organized for data extraction and/or that are received in paper form and then stored as scanned images. It is difficult to extract data from such forms without investing significant resources in manual data entry.

It would be desirable to overcome one or more of these deficiencies.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

An embodiment is directed to a computer-implemented method for automatically determining data relationships, comprising generating, with the computer, a graphical user interface (GUI); receiving, at the computer, a first user input on the GUI to generate first and second data source icons on the GUI, the first and second data source icons representing respective data sources of raw data sets to import to the computer; automatically importing, to the computer, the raw data sets from the respective data sources; receiving, at the computer, a second user input on the GUI to connect an input of a merge icon to respective outputs of the first and second data source icons, the merge icon causing the computer to automatically merge the raw data sets to form a merged data set, the merged data set including multiple data set variables; receiving, at the computer, a third user input on the GUI to connect an output of the merge icon to an input of a data set variable selection icon, the data set selection icon including a user input to identify selected data set variables from the multiple data set variables; receiving, at the computer, a fourth user input on the GUI to connect an output of the data set variable selection icon to an input of a build model icon, the build model icon causing the computer to automatically build a customized model using the selected data set variables and respective data, wherein the customized model does not require any additional input from the user; and automatically generating, with the computer, a graphical representation of the selected data set variables using the customized model.

An embodiment is directed to a computer for determining data relationships, comprising a processor and; non-volatile memory operatively coupled to the processor, the non-volatile memory storing computer-readable instructions that, when executed by the processor, cause the processor to generate a graphical user interface (GUI); receive a first user input on the GUI to generate first and second data source icons on the GUI, the first and second data source icons representing respective data sources of raw data sets to import to the computer; automatically import the raw data sets from the respective data sources; receive a second user input on the GUI to connect an input of a merge icon to respective outputs of the first and second data source icons, the merge icon causing the processor to automatically merge the raw data sets to form a merged data set, the merged data set including multiple data set variables; receive a third user input on the GUI to connect an output of the merge icon to an input of a data set variable selection icon, the data set selection icon including a user input to identify selected data set variables from the multiple data set variables; receive a fourth user input on the GUI to connect an output of the data set variable selection icon to an input of a build model icon, the build model icon causing the processor to automatically build a customized model using the selected data set variables and respective data, wherein the customized model does not require any additional input from the user; and automatically generate a graphical representation of the selected data using the customized model.

And an embodiment is directed to a system for determining data relationships, comprising a server comprising a server processor and; non-volatile server memory operatively coupled to the server processor, the non-volatile server memory storing computer-readable instructions that, when executed by the server processor, cause the server processor to generate a graphical user interface (GUI); receive a first user input on the GUI to generate first and second data source icons on the GUI, the first and second data source icons representing respective data sources of raw data sets to import to the computer; automatically import the raw data sets from the respective data sources; receive a second user input on the GUI to connect an input of a merge icon to respective outputs of the first and second data source icons, the merge icon causing the server processor to automatically merge the raw data sets to form a merged data set, the merged data set including multiple data set variables; receive a third user input on the GUI to connect an output of the merge icon to an input of a data set variable selection icon, the data set selection icon including a user input to identify selected data set variables from the multiple data set variables; receive a fourth user input on the GUI to connect an output of the data set variable selection icon to an input of a build model icon, the build model icon causing the server processor to automatically build a customized model using the selected data set variables and respective data, wherein the customized model does not require any additional input from the user; and automatically generate a graphical representation of the data set variables using the customized model; and a client computer comprising a client processor and; non-volatile client memory operatively coupled to the client processor, the non-volatile server memory storing computer-readable instructions that, when executed by the client processor, cause the client processor to display the GUI on a display coupled to the client computer; send the first, second, third, and fourth user inputs to the server; and display the graphical representation of the dataset variables using the customized model on the display.

BRIEF DESCRIPTION OF THE DRAWINGS

For a fuller understanding of the nature and advantages of the present concepts, reference is made to the detailed description of preferred embodiments and the accompanying drawings.

FIG. 8 illustrates an example of a spreadsheet plug-in.

DETAILED DESCRIPTION

Figure 1:
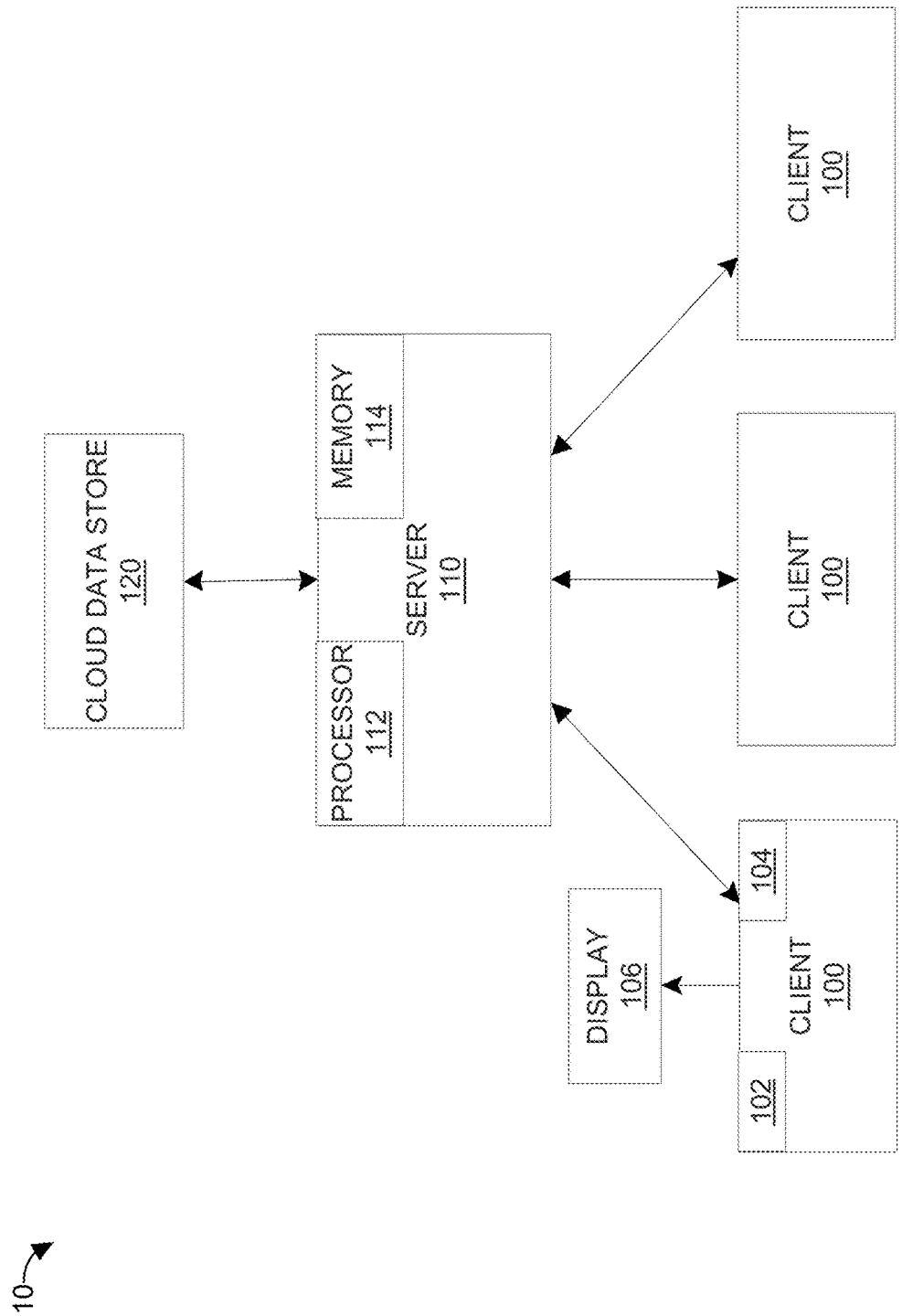
FIG. 1 is a block diagram of a system for automated processing of datasets using intuitive user interfaces according to an embodiment.

FIG. 1 is a block diagram of a system 10 for automated processing of datasets using intuitive user interfaces according to an embodiment. The system 10 includes one or more clients 100 that are in network communication with a server 110. Each client 100 includes a processor 102 and memory 104 that is accessible to the processor 102. The memory 104 can include cache, random access memory (RAM), an internal or external memory device (e.g., hard drive), and/or memory that is accessible over a network. Each client 100 can also include a display 106 (e.g., an internal display or an external display) that can display text, images, and/or user interfaces.

The server 110 includes a processor 112 and memory 114 that is accessible to the processor. Memory 114 can include the same types of memory as memory 104. Memory 104, 114 can include non-volatile memory that can store program instructions that can be executed by the respective processors 102, 112 to perform one or more functions and/or routines as described herein.

Figure 2:
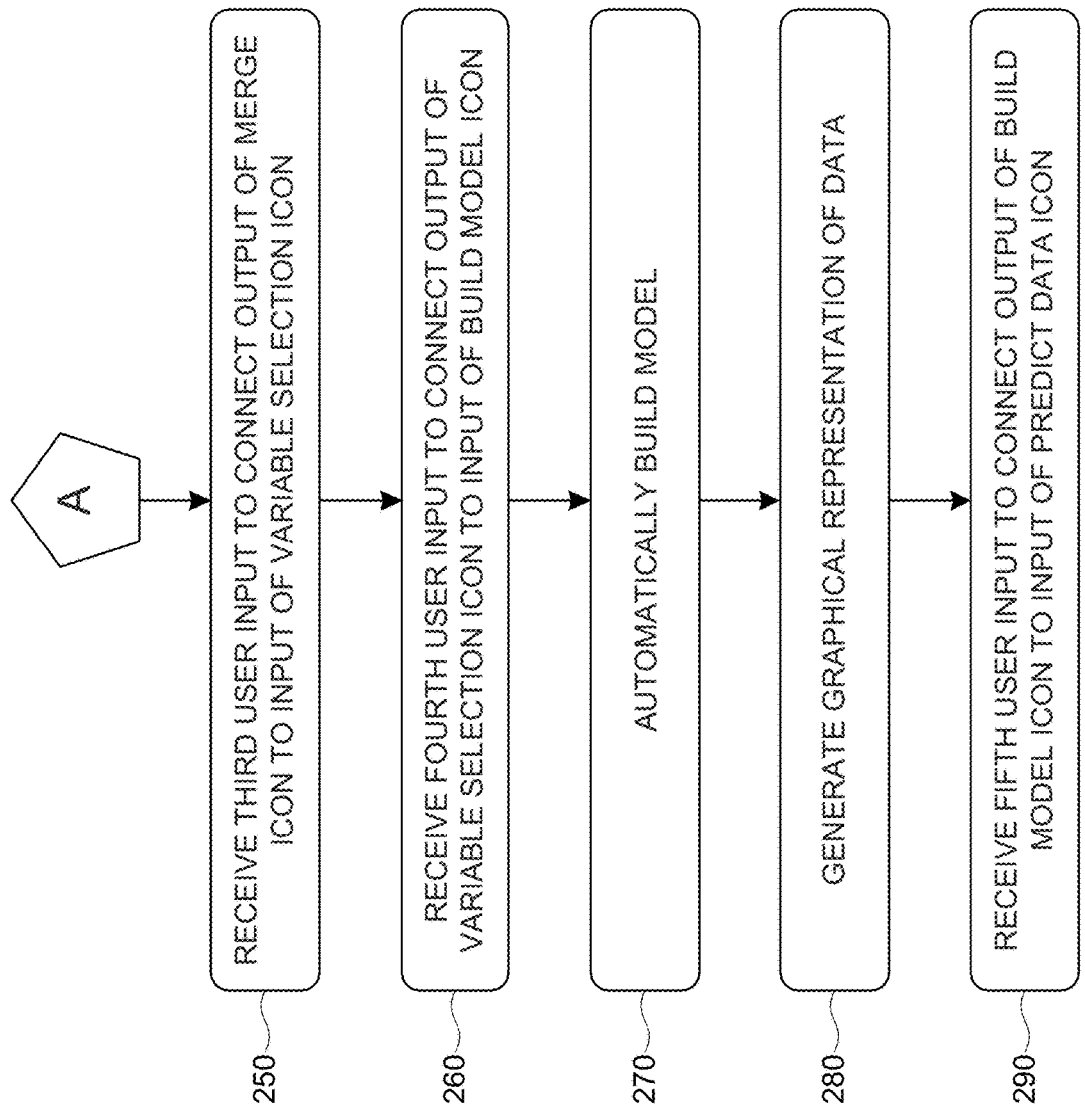
FIG. 2 is a flow chart of a method for automated processing of datasets using intuitive user interfaces according to an embodiment.

Additional details regarding system 10 are described below with respect to FIG. 2, which is a flow chart of a method 20 for automated processing of datasets using intuitive user interfaces according to an embodiment.

In step 200, the server 110 generates a graphical user interface (GUI) that allows a user to manipulate and/or form logical relationships between different raw data sets. The GUI is sent (e.g., encoded in an output signal) to the client 100 (or clients 100) to display on display 106. The first GUI can be sent as HTML, image data, or other format. A user of the client 100 can generate user inputs on the GUI by using a user-input device such as a mouse, a keyboard, a voice command, and/or another user-input device. The client 100 sends the user inputs to the server 110 over a network connection. The server 110 can take one or more actions and/or perform one or more functions in response to the inputs. In some embodiments, multiple clients 100 can have access to the GUI in a collaborative environment. As such, different clients 100 can send at least one or all of the user inputs to the server 110.

In step 210, the server 110 receives a first user input on the GUI to generate first and second data source icons on the GUI. Each data source icon represents a data source of a raw data set to be imported into the server 110. In an embodiment, the first user input can include a data set importation request in which the user identifies the data source and optionally the raw data set for importation. In another embodiment, the first user input includes modifying or manipulating a generic version of a data source icon (e.g., stored in a library of icons) to identify the data source and optionally the raw data set for importation. The first user input can be sent from any of the clients 100.

One or more of the raw data sets can be received from the client 100, which can have the raw data set(s) stored in memory 104. Additionally or alternatively, one or more of the raw data sets can be received from one or more cloud data stores 120, which can include a cloud storage provider (e.g., Amazon Web Services), a cloud spreadsheet provider (e.g., Google Sheets, Airtable), a cloud analytics provider (e.g., Adobe Analytics), a cloud database, and/or another cloud data store. In one example, the server 110 generates a user interface that is displayed on the display 106 of the client 100, such through a web browser or application running on the client 100. The user interface can include a drop-down menu that includes options for importing the raw data sets to the server 110.

When the user selects importing raw data sets from the cloud data store 120, the user interface can prompt the user to enter his/her credentials for the cloud data store 120. The credentials can be sent directly to the cloud data store 120 to provide the server 110 access to the raw data sets on the cloud data store 120. In some embodiments, the user can select which raw data sets is/are provided to the server 110. Alternatively, the credentials can be sent to the server 110 and the server can then use the credentials to access the raw data sets on the cloud data store 120. In some embodiments, the server 110 can provide generate a user interface that allows the user to select which raw data sets is/are provided to the server 110.

In step 220, the server 110 automatically imports the raw data sets from the first and second data sources. The server 110 can store the raw data sets in memory 114.

The server 110 can use initially process each raw data set to determine the data type(s) in the raw data set. For example, the raw data set can include categorical data (e.g., text such as color, shape, etc.), numerical data, and/or time-series data (e.g., date, time).

In step 230, the server 110 receives a second user input on the GUI to connect an input of a merge icon to respective outputs of the first and second data source icons to form a logical relationship between the corresponding raw data sets. The merge icon causes the computer in step 240 to automatically merge the raw data sets to form a merged data set. The merged data set including multiple data set variables and associated data. The name of each data set variables can be determined by a header in a column of data, a column name for a column of data, etc. The second user input can be sent from any of the clients 100, which can be the same or different client 100 that sent the first user input.

Prior to merging, the server 110 can automatically perform one or more operations on the raw data sets. For example, the server 110 can automatically transform the raw data sets to a common data set format. The raw data sets can have different formats because they may be received from different cloud data stores 120, which can encode the data sets differently. In addition, the raw data in the raw data sets can be logically arranged in different ways. For example, one raw data set can include raw data that is arranged in columns while another raw data set can include raw data that is arranged in rows. Automatic transformation can address both of these issues so that the raw data is encoded and logically arranged in the same manner in each raw data set. The user can select the appropriate transformation functions and arrange them in a logic sequence, via the GUI, to transform the datasets into a format in which they are compatible with one another. For example, the dimensionality or units or other aspects of the data sets can be aligned with one another, especially if results are to be generated using two or more data sets.

Prior to or after merging, the server 110 can also perform a cleaning operation on the data. The cleaning operation can include automatically identifying and optionally filing in missing data values, automatically identifying apparent data errors (e.g., data that is different than the expected value) and optionally suggesting replacement data for the apparent data errors, automatically joining duplicative columns of data with different data heading (e.g., variables), and/or automatically detecting and/or removing duplicative data. The missing data values and apparent data errors can be identified by automatically modeling the imported data sets, for example using a probabilistic graphical model as discussed herein.

In step 250, the server 110 receives a third on the GUI to connect an output of the merge icon to an input of a data set variable selection icon. The data set selection icon can be manipulated or selected (e.g., using a user input) by the user to identify selected data set variables from the multiple data set variables. The selected data set variables can be a subset of the multiple data set variables. The server 110 can automatically extract the variable names for the multiple data set variables from the merged data set. The third user input can be sent from any of the clients 100, which can be the same or different client 100 that sent the first user input and/or the second user input.

In step 260, the server 110 receives a fourth user input on the GUI to connect an output of the data set variable selection icon to an input of a build model icon. The fourth user input can be sent from any of the clients 100, which can be the same or different client 100 that sent the first user input, the second user input, and/or the third user input.

The build model icon causes the computer in step 270 to automatically build a customized model using the selected data set variables and respective data. The model building does not require any additional input from the user. The customized model can include a probabilistic graphical model of the selected data set variables and respective data.

In step 280, the server 110 automatically generates a graphical representation of the dataset, which may be stored on the server computer. The model may be a "bespoke" model generated using human, machine or a combination of human and machine inputs to address the specific requirements and data presented in a given situation.

In step 290, the server 110 receives a fifth user input on the GUI to connect an output of the build model icon to an input of a predict data icon. The predict data icon causes the computer to automatically predict data (e.g., at least one data value) using the customized model. The fifth user input can be sent from any of the clients 100, which can be the same or different client 100 that sent the first user input, the second user input, the third user input, and/or the fourth user input.

In some embodiments, steps 260, 270, and 290 can be combined. For example, the build model and predict data icons can be combined into a build and predict icon, which can cause the computer to automatically build a customized model (e.g., as discussed above in step 270) and to automatically predict data using the customized model. The build and predict icon can optionally cause the server 110 to automatically generates a graphical representation (e.g., graph) of the customized model for display on the computer 100 using display 106.

Figure 3:
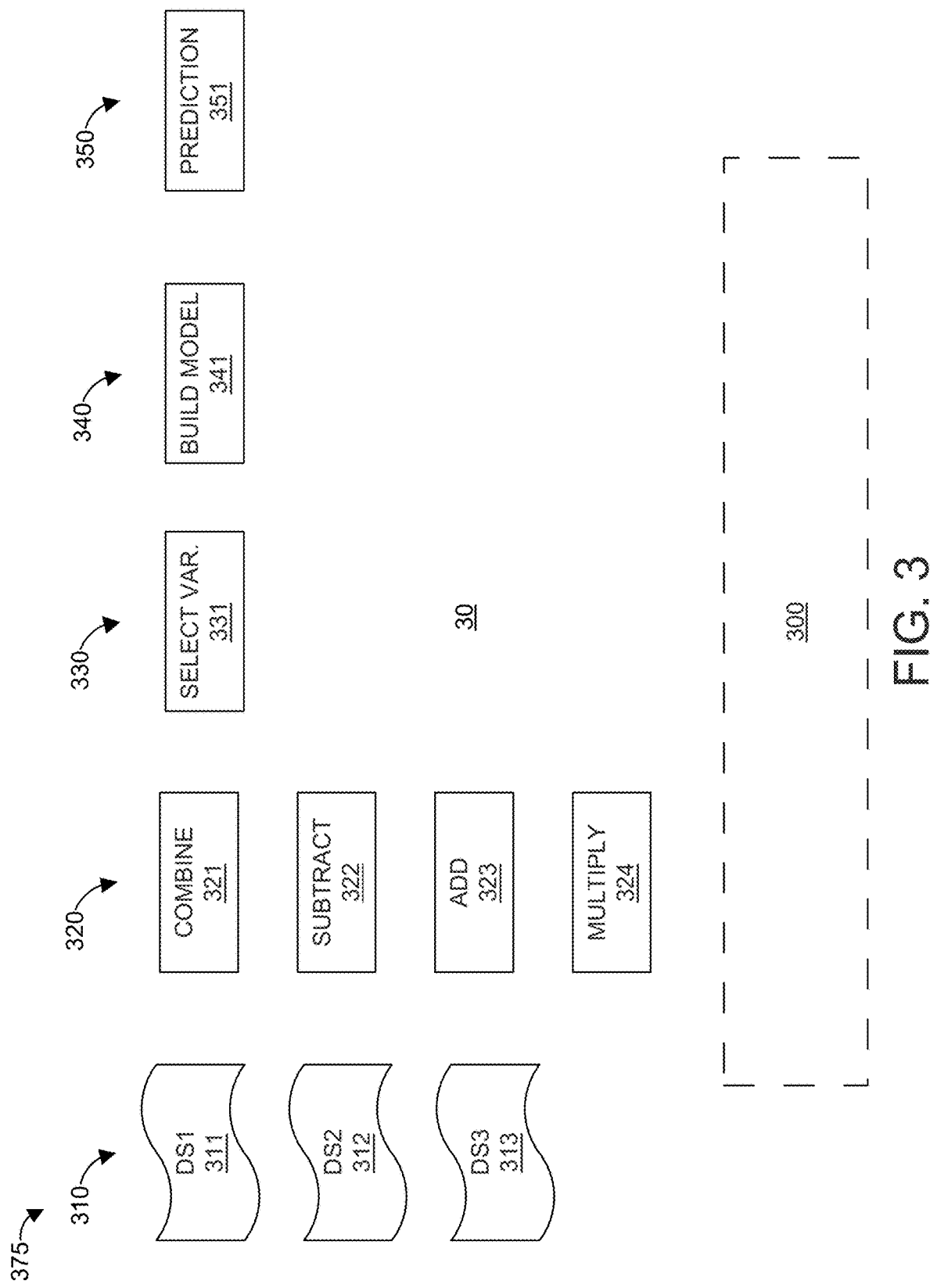
FIG. 3 illustrates an example of a graphical user interface (GUI) for generating a customized model of data according to an embodiment.

An example of a GUI 30 for generating a customized model of data according to an embodiment is illustrated in FIG. 3. The GUI 30 can include a library of icons 300 that can be dragged and dropped (or otherwise manipulated) to form logical relationships in a model-building window 375.

The library of icons 300 can include a first category 310 of icons 311-313 that represent the data sources from which the raw data set(s) were received by the server 110. Each icon 311-313 can represent a different data source. For example, icon 311 represents a first data source DS1 (e.g., local spreadsheet data received from the client 100), icon 312 represents a second data source DS2 (e.g., cloud spreadsheet data received from a second cloud data store 120), and icon 313 represents a third data source DS3 (e.g., cloud database data received from a third cloud data store 120). The icons 311-313 can be automatically generated when different data sources are connected or imported to the server 110. Alternatively, the icons 311-313 can begin as generic icons and can then be modified when the user connects or imports data sources to the server 110.

The library of icons 300 can further include a second category 320 of icons 321-314 that represent an operation to apply to the data sources and/or to particular data (e.g., data set variables) from the data sources. For example, icon 321 represents a combine operation in which multiple data sets or data from multiple data sets are combined or merged. Icon 322 represents a subtract operation in which multiple data sets or data from multiple data sets are mathematically subtracted. Icon 323 represents an addition operation in which multiple data sets or data from multiple data sets are mathematically added. Icon 324 represents a multiply operation in which multiple data sets or data from multiple data sets are mathematically multiplied. Additional or fewer icons representing additional or fewer operations can be provided, such as for a division operation.

The library of icons 300 can also include a third category 330 of icon(s) 331 for selecting one or data set variables (e.g., a column of data) from the data source(s). The library of icons 300 can also include a fourth category 340 of icon(s) 341 for building a customized model of one or more data sets. The library of icons 300 can further include a fifth category 350 of icon(s) 351 for predicting data.

Figure 4:
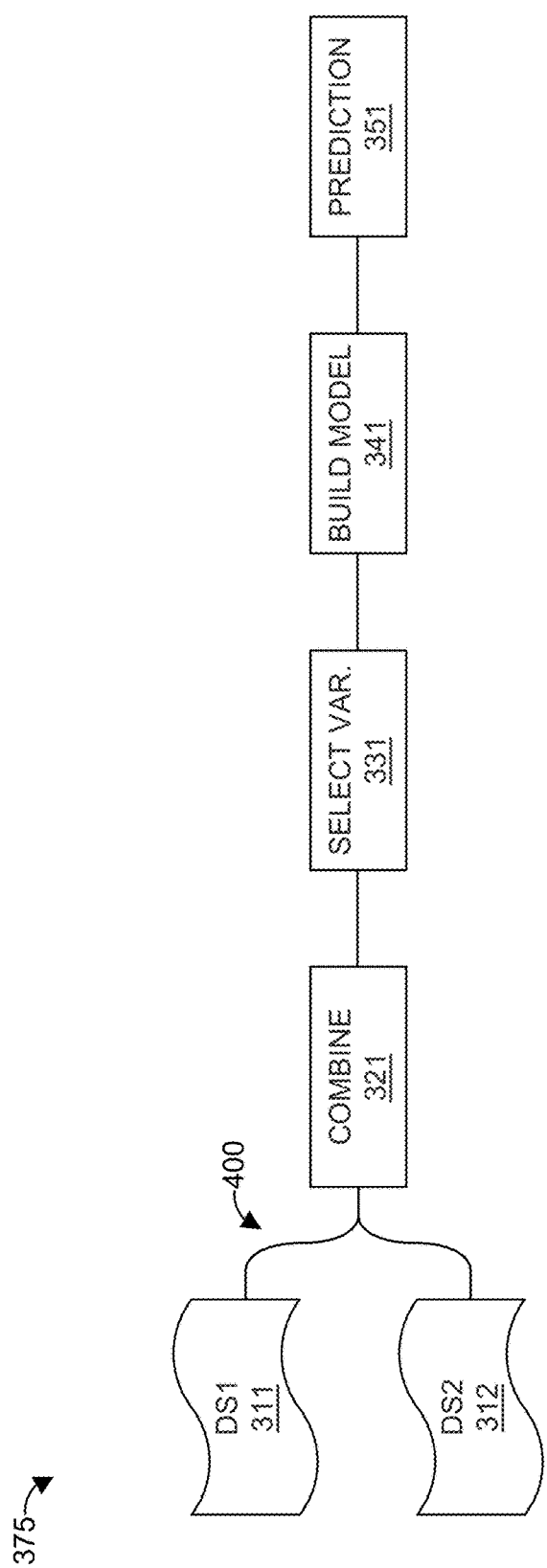
FIG. 4 illustrates example logical relationships that can be formed visually or graphically in the GUI of FIG. 3.

FIG. 4 illustrates example logical relationships that can be formed visually or graphically in the model-building window 375. The example relationships use icons 311, 312, 321, 331, 341, and 351 and connections lines 400. The outputs of icons 311 and 312 (DS1 and DS2, respectively) are graphically connected, using connection line 400, to the input of icon 321, which represents the combination operation. The output of icon 321 is graphically connected, using connection line 400, to the input of icon 331, which represents the select data set variable operation. The output of icon 331 is graphically connected, using connection line 400, to the input of icon 341, which represents the build model operation. The output of icon 341 is graphically connected, using connection line 400, to the input of icon 351, which represents the data prediction operation. The logical relationships formed in the model-building window 375 cause the server 110 to perform the requested operations without any additional user involvement or knowledge of artificial intelligence. The icons 311, 312, 321, 331, 341, and 351 and connection lines 400 can be arranged using a mouse or other user-input device to computer 100.

The combination operation represented by icon 321 causes the server 110 to automatically combine or merge the data from data set sources DS1 and DS2 to form a merged data set (e.g., as discussed above in step 240). The server 110 can automatically transform the raw data from data set sources DS1 and DS2 into a common data set format prior to or during the combination operation associated with icon 321. In addition, the server 110 can automatically perform a cleaning operation on the raw data prior to or during the combination operation associated with icon 321

The select data set variable icon 331 can be modified or selected by the user to select data set variables from the common data set. For example, the user can double-click or right-click on the select data set variable icon 331 to bring up a list of all data set variables in the common data set. The user can select any of these data set variables, and only the respective data of the selected data set variables are output from the select data set variable icon 331. In the background, the server 110 can automatically create extract or identify the respective data of the selected data set variables for further processing. In some embodiments, extracting the respective data can include copying the respective data to a new data set.

The build model icon 341 automatically causes the server 110 to build a customized model based on the respective data from the selected data set variables (from select data set variable icon 331). The server 110 can use artificial intelligence to build the model. For example, the server 110 can build a customized model using probabilistic graphical models where each of the selected data set variables (e.g., columns of data with appropriate headers or titles) can correspond to a random variable. The collection of these random variable can represent a desired joint distribution. The structural relationship between these random variables, represented through probabilistic graphical models where there are potentially edges between any pair of data set variables and associated parameters, captures the essence of the underlying probabilistic graphical model.

The observations of this probability distribution are effectively the rows of the data within a given datasheet. If data is timestamped (e.g., time-series data), it is likely represented in the datasheet with one column representing time and another column representing a data value at that time. In the probabilistic graphical model, time becomes one of the random variables while the data values becomes another random variable. The relationship between time and value can be captured through the edge of this graph along with parameters associated with it. Any form of data can be meaningfully captured using a probabilistic graphical model. In a non-limiting embodiment, this can employ a graph-based program that identifies a graph having graph nodes corresponding to update functions and where a computing unit (e.g., processor, computer, circuit for executing program instructions) can be associated with each respective node of the graph nodes. Reference is made to, e.g., U.S. Pat. No. 10,565,038 by the present inventors for further aspects of this graph-based computing, which is hereby incorporated by reference.

The server 110 can generate a visual image of the respective data of the selected data set variables. The visual image can be sent to the client 100 as image data that can be displayed on display 106.

The prediction icon 351 causes the server 110 to automatically generate a prediction of the respective data using the customized model created as a result of build model icon 341. The prediction can include data values that are between discrete data points in the selected data. For example, when the selected data includes time-series data (e.g., by date), the prediction can include data values for time-series (e.g., dates) between the discrete data points in the selected data. In addition, the prediction can include future time-series data or other data outside the data range of selected data.

In some embodiments, the prediction icon 351 can be modified or selected by the user to select data set variables that can have user-adjustable weights in the customized model to generate data predictions. A data set variable having a user-adjustable weight can be referred to as a predictive control. When the user manipulates the prediction icon 351 to form predictive controls, the server 110 automatically generates a visual image (e.g., graph) of the probabilistic graphical model that includes a GUI (e.g., a prediction GUI) that allows the user to adjust or customize the predictive controls. For example, the GUI can include a radio button, a slider, or another GUI interface that allows the user to customize and/or adjust the predictive controls. Data representing the GUI can be sent from the server 110 to the client 100 to display on display 106.

When the user adjusts a predictive control, the server 110 can automatically generate a new visual image (e.g., graph) that includes a modified probabilistic graphical model with the modified weight(s) from the predictive controls. The new visual image can also include the unmodified and modified probabilistic graphical models which can be simultaneously generated by server 110 and displayed on display 106 (e.g., via an output signal from server 110 to client 100). The unmodified and/or modified probabilistic models can be visually distinct (e.g., by color, dashed lines, etc.).

For example, the client 100 can generate a first prediction user interface input when the user sets a first predictive control at a first weight. The client 100 sends the first prediction user interface input to the server 110, which can automatically set the customized weight of a corresponding data set variable according to the first predictive control setting. The server 110 uses the customized weight of the corresponding data set variable to determine or calculate first predicted data. The server 110 can automatically generate a graphical representation of the first predicted data for display on the client 100 (via display 106). The graphical representation of the first predicted data can be displayed simultaneously with the graphical representation of the customized model.

The client 100 can also generate a second prediction user interface input when the user sets or adjust another predictive control (e.g., adjusting the first predictive control or adjusting a second predictive control). The client 100 sends the second prediction user interface input to the server 110, which can automatically set the customized weight of a corresponding data set variable according to the second prediction user interface input. The server 110 uses the customized weight of the corresponding data set variable to determine or calculate second predicted data. The server 110 can automatically generate a graphical representation of the second predicted data for display on the client 100 (via display 106). The graphical representation of the second predicted data can be displayed simultaneously with the graphical representation of the first predicted data and/or of the customized model.

The predictive controls can be used to determine what-if scenarios. For example, if the weather (a first data set variable) is unfavorable, how will that affect sales (a second data set variable). This scenario can be determined by adjusting the relative weight of the first data set variable using the predictive controls.

Figure 5:
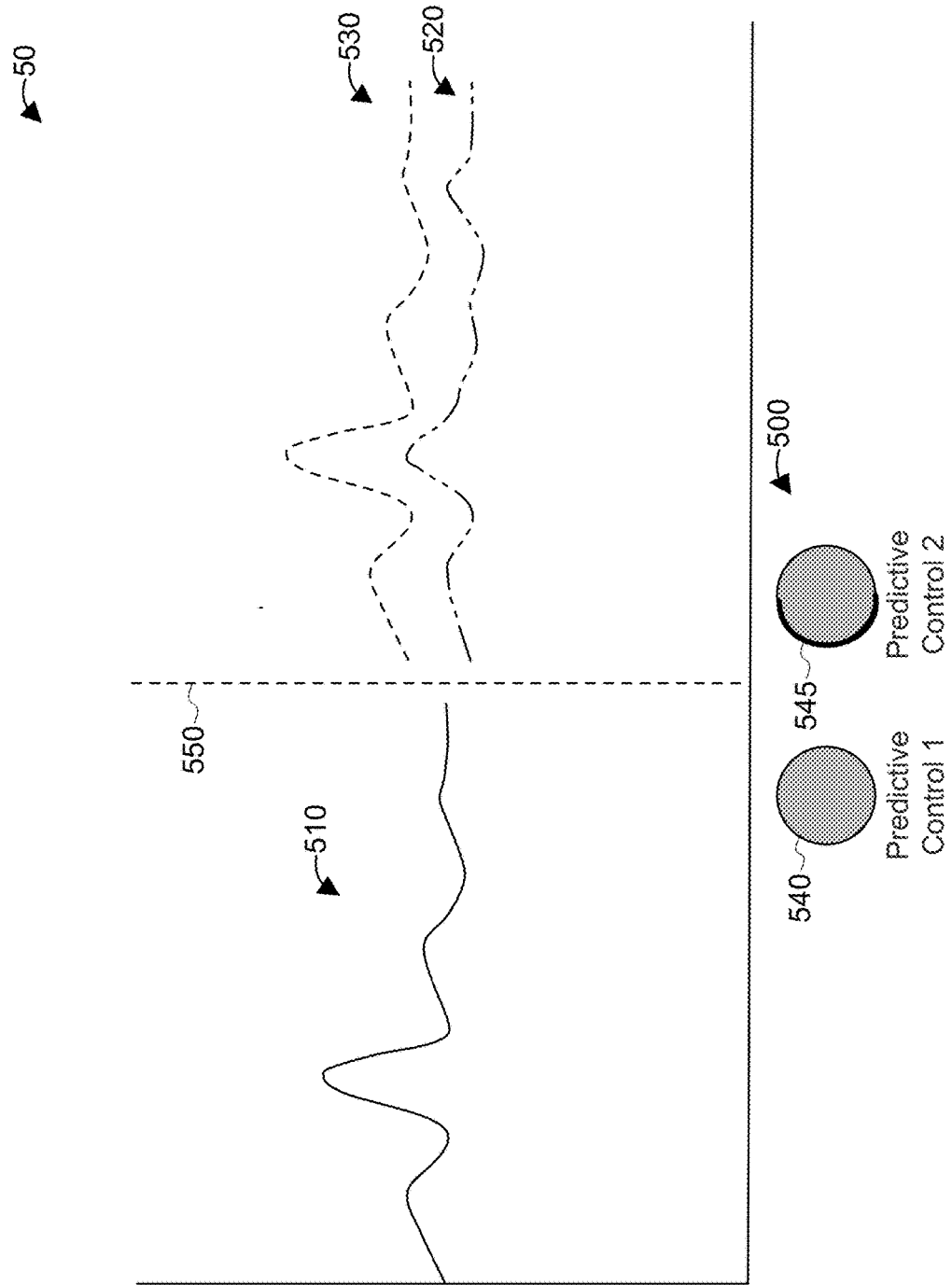
FIG. 5 illustrates example graphs generated using a second GUI that uses a method of predictive control according to an embodiment.

FIG. 5 illustrates example graphs 50 generated using a second GUI 500 (e.g., a prediction user interface) that includes predictive controls according to an embodiment. The graphs 50 include an unmodified probabilistic graphical model graph 510 and modified graphical model graphs 520, 530. The modified graphical model graphs 520, 530 are generated by the server 110 in response to the settings of the predictive controls using radio buttons 540 in the second GUI 500 and represent respective predictions. The radio buttons 540 can visually indicate (e.g., using arc 545) the settings or weights of the respective predictive controls. The second GUI 500 (e.g., radio buttons 540) are displayed below the graphs 50. In other embodiments, the second GUI 500 can be displayed above the graphs 50, next to the graphs 50, and/or overlaid on the graphs 50.

Graphs 520 and 530 correspond to different settings (e.g., weights) of the predictive controls. The lines and/or colors of graphs 510, 520, and 530 are different to visually distinguish them. A line 550 or other visual indicator can be used to visually separate the unmodified probabilistic graphical model graph 510 from the modified graphical model graphs 520, 530.

Figure 6:
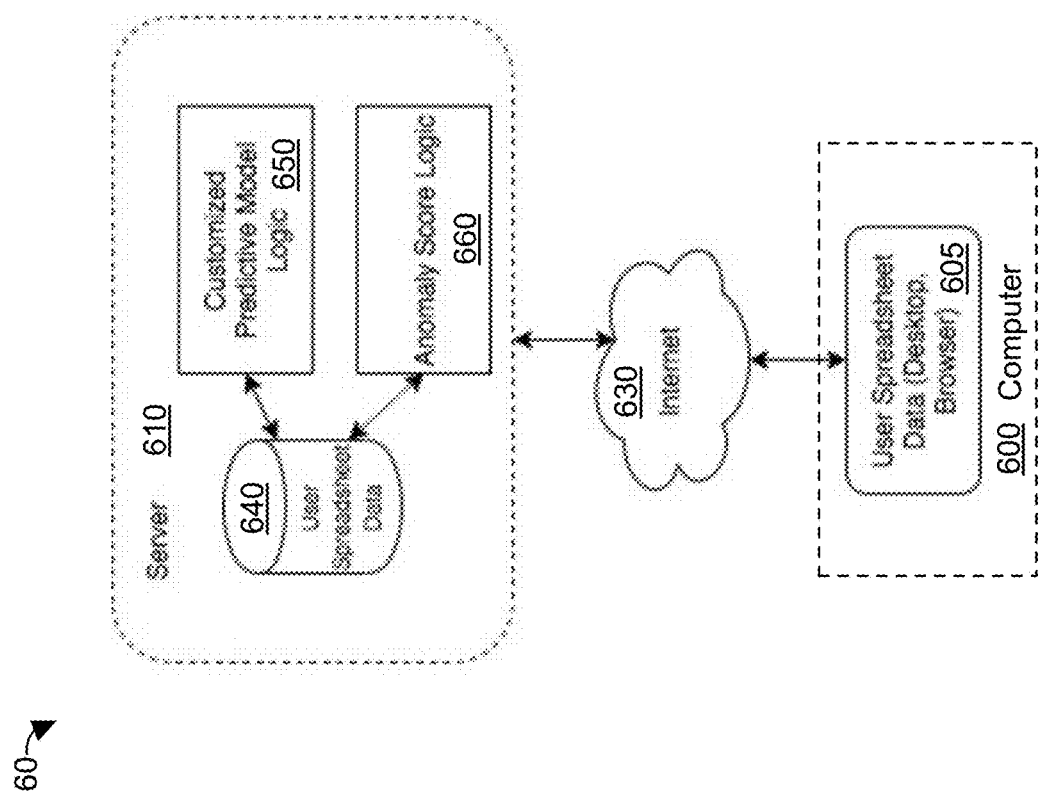
FIG. 6 is a block diagram of a system for predictive modeling of a dataset using artificial intelligence (AI) according to another embodiment.

FIG. 6 is a block diagram of a system 60 for predictive modeling of a dataset using AI according to another embodiment. The system 60 includes a computer 600 and a server 610 that are operatively connected to each other via a network such as the internet 630. System 60 can be the same as or different than system 10 (and vice versa).

The computer 600 comprises at least one hardware-based microprocessor that executes computer-readable instructions (e.g., firmware, operating system, applications, etc.) to perform one or more tasks or routines. The computer-readable instructions can be locally stored in memory of the computer 600 and/or they can be downloaded from the Internet. The memory can also store one or more datasets, such as user spreadsheet data 605. For example, user spreadsheet data 605 can be stored locally on the computer 600 and accessed using Microsoft Excel® or another spreadsheet program. Alternatively, the spreadsheet data 605 can be stored on a server (e.g., server 610 or another server) and accessed via Internet 630 (and/or another network connection). For example, the spreadsheet data 605 can be stored on a cloud-based file storage service such as Google Drive™ or DropBox®. In a specific example, the spreadsheet data 605 can be stored in a cloud-based spreadsheet program such as Google Sheets™. In another embodiment, the spreadsheet data 605 can comprise a database or another logical dataset. The computer 600 can comprise a personal computer (e.g., laptop or desktop), a tablet, a smartphone, or another computing device.

The server 610 comprises at least one hardware-based microprocessor and memory. The memory can store computer-readable instructions that are executable by the microprocessor to perform one or more tasks or routines. The computer 600 and server 610 can operate in a client-server relationship. In some embodiments, the server 610 can comprise a distributed server or a shared/logical server. In some embodiments, the system 60 includes multiple computers 600 (e.g., client computer).

Figure 7:
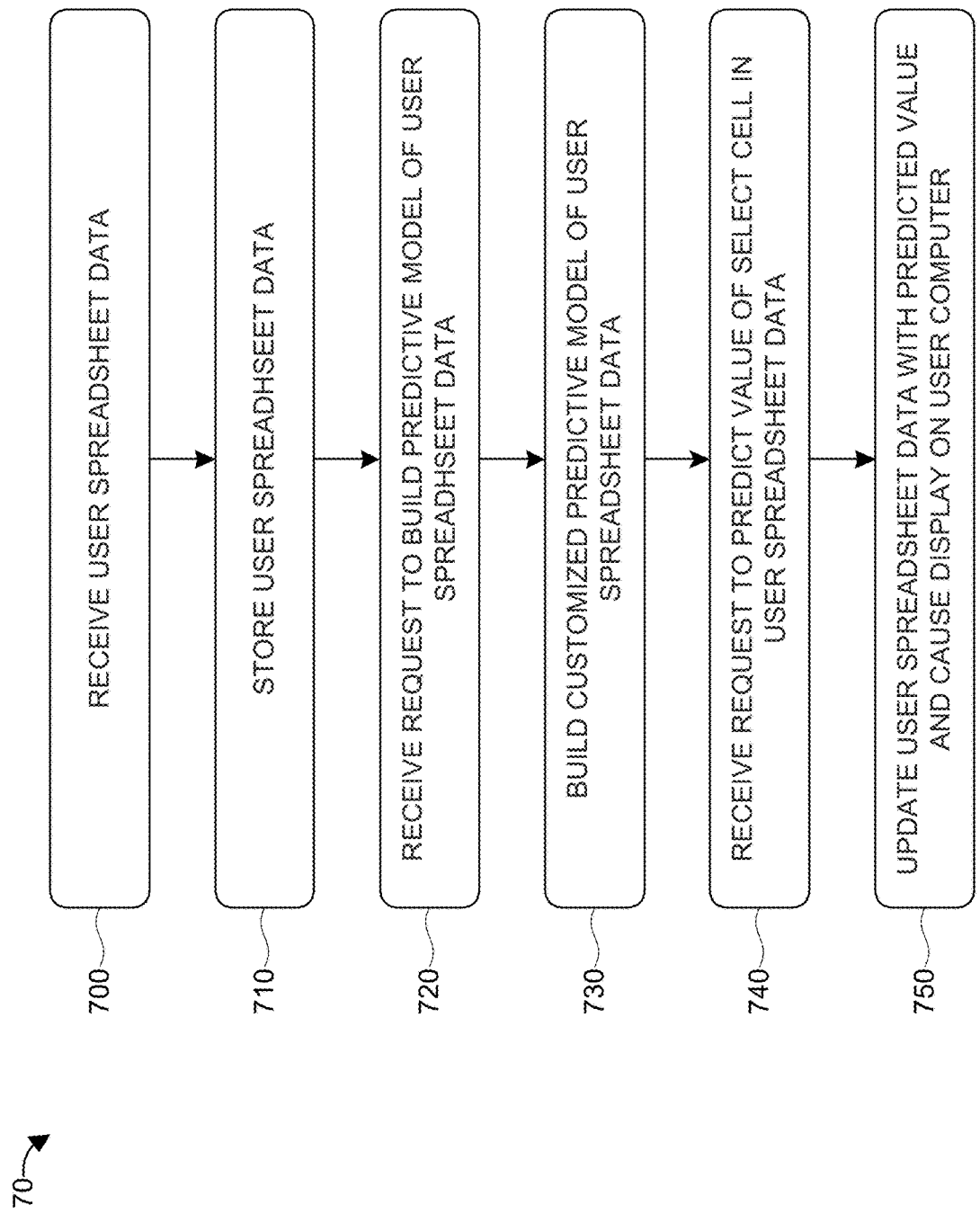
FIG. 7 is a flow chart for predictive modeling of a dataset using AI according to an embodiment.

Additional aspects of the system 60 are described below in connection with FIG. 7, which is a flow chart 70 for predictive modeling of a dataset using AI according to an embodiment.

In step 700, the server 610 receives the user spreadsheet data 705 over a network connection such as the internet 730. The user spreadsheet data 705 can be sent from the user's computer 700. For example, the user spreadsheet data 705 can be stored in a local file that is transmitted from the computer 700 to the server 610. Alternatively, the user spreadsheet data 705 can be stored in a cloud-based file that is accessible on the computer 700 via an application such as a web browser, Microsoft Excel®, or another application. The cloud-based file can be saved locally to the computer 700 and then transmitted to the server 610. Alternatively, the user can "share" the cloud-based file with the server 610 such as by granting permissions or access to the server 610 or providing the user's credentials to the server 610.

In step 710, a copy of the user spreadsheet data 705 is stored as server spreadsheet data 740 (FIG. 6) in the memory of server 610 or in network communication therewith.

Figure 8:
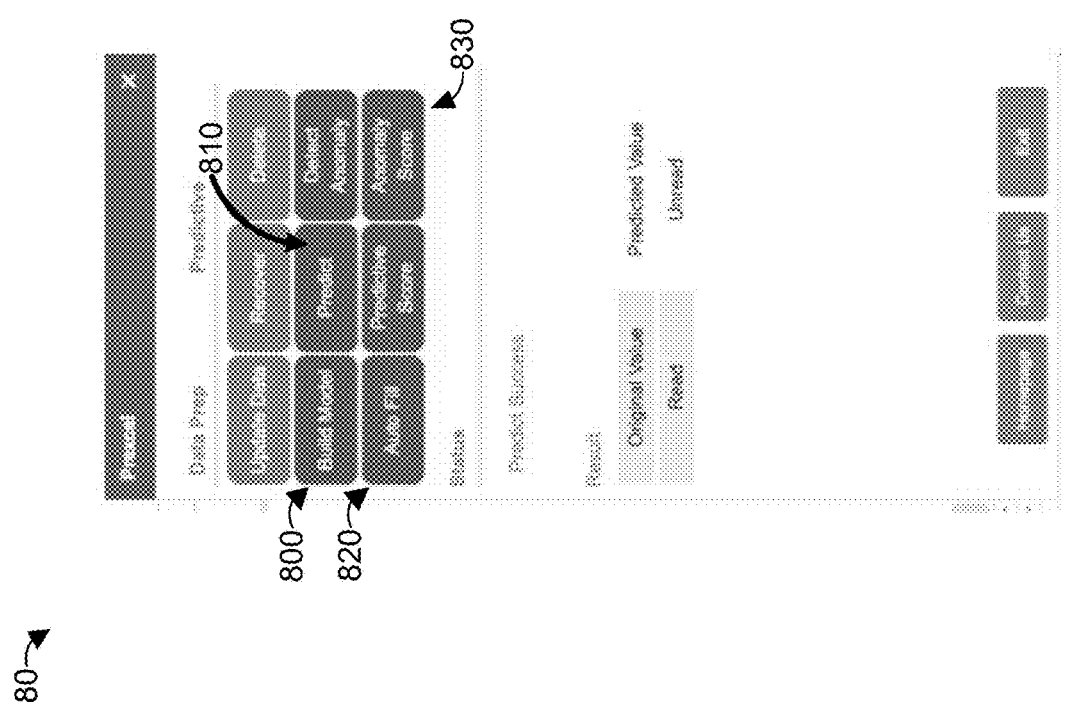

In step 720, the server 610 receives a request to build a predictive model for the server spreadsheet data 640. In one embodiment, the user installs and executes an application or spreadsheet plug-in (e.g., Prexcel™) which can provide an intuitive and simple user interface for generating predictive models of datasets. An example of a spreadsheet plug-in 80 is provided in FIG. 8. Using spreadsheet plug-in 80, the user can request the server 610 to build a predictive model using build model button 800. The predictive model can be based on the columns and rows of data in the spreadsheet including any headers of the columns or rows. In addition, the predictive model can be based on one or more of the following data types: free-form text, numerical data, categorical data (categorical text), and/or time series data.

In step 730, the server 600 builds the predictive model, which can be based on the entire dataset or a portion thereof (e.g., one or more selected columns and/or rows). The predictive model can be built using customized predictive model logic 650 (FIG. 6) in the server 610. The customized predictive model logic 650 includes AI, machine learning, and/or other logic that generates a predictive model that is specific to the dataset uploaded to the server (e.g., server spreadsheet data 640). A generic predictive model is not used to "fit" the dataset—a custom predictive model is chosen based on the data. The customized predictive model logic 650 can comprise hardware and/or software logic. In some embodiments, the customized predictive model logic 650 can comprise a predictive graphical model.

Figure 9:
FIG. 9 illustrates an example of a spreadsheet with the spreadsheet plug-in of FIG. 8.

In step 740, the server 610 receives a request to predict a value of one or more spreadsheet cells or a request to automatically fill one or more spreadsheet cells with a predicted value. The request can be generated by the computer 600 when the user presses button 810 or 820 (FIG. 8), respectively, in spreadsheet plug-in 80. For example, the user can highlight a cell 900 in a spreadsheet 90 and press the autofill button 820 to automatically fill in the highlighted cell 900 with a predicted value based on the customized predictive model, as illustrated in FIG. 9. The data in spreadsheet 90 can include numerical data, categorical data, and/or time-series data. This may be useful in predicting the number of links to use in an email or in performing a what-if analyses for instant and interactive A/B testing (e.g., predicting under what conditions an email will be read or unread).

Alternatively, the server 610 can receive a request to calculate an anomaly score for one or more spreadsheet cells. An anomaly score is a measure of how closely one or more data values fit a customized predictive model. If the data value fits within an error tolerance of the customized predictive model, the anomaly score is low. However, if the value is outside of this error tolerance, the anomaly score is high. Thus, the anomaly score can provide an indication of whether a given data value may need additional scrutiny or analysis.

The request to calculate an anomaly score can be generated by the computer 600 when the user presses button 830 (FIG. 8) in spreadsheet plug-in 80. The server 610 can determine the anomaly score using anomaly score logic 660 (FIG. 6) in the server 610. The anomaly score logic 660 includes AI, machine learning, and/or other logic that applies the predictive model to the dataset. The anomaly score logic 660 can comprise hardware and/or software logic.

In step 750, the server 610 generates an output signal that causes the computer 100 (e.g., spreadsheet application or browser) to display the predicted value(s) and/or scores (e.g., anomaly and/or predictive scores) in one or more cells of the spreadsheet.

The system 60 and method 70 can have various applications including (a) fixing errors in data, such as typos (e.g., predicting the "right value"), (b) filling in and fixing missing values, (c) performing interactive and batch what-if analyses, (d) forecasting/predictive modeling, and/or (e) classifying data. An advantage of the system 60 and method 70 is that they can operate with many different data types (inputs) (e.g., freeform text, numerical data, categorical data (categorical text), and/or time series data) and they can detect each data type automatically (e.g., without the user providing any additional information), system 60 and method 70 can automatically build the appropriate predictive model/anomaly model after automatically detecting the data types in the dataset (spreadsheet). In addition, the system 60 and method 70 can function with missing data.

Another aspect of the technology is directed to user interfaces for data structuring and automated analysis.

Figure 10:
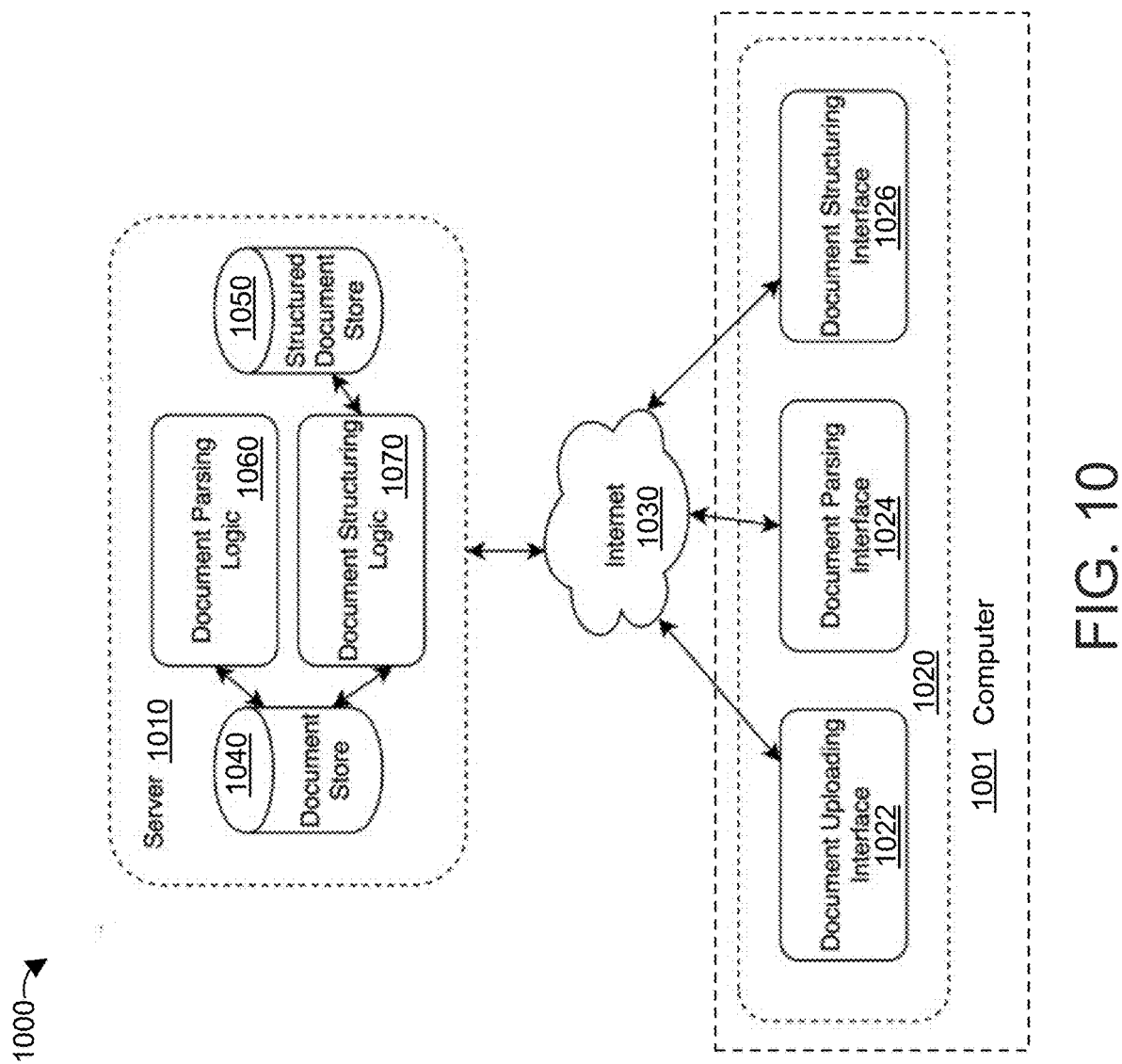
FIG. 10 is a block diagram of a system for parsing and structuring unstructured data according to an embodiment.

FIG. 10 is a block diagram of a system 1000 for parsing and structuring unstructured data according to an embodiment. The system 1000 includes a computer 1001 and a server 1010 in network communication through a network such as the internet 1030. The computer 1001 and server 1010 can be the same as the computer 600 and the server 610, respectively, discussed above, except as described herein.

The computer 1001 includes a user document parsing and structuring client 1020 running thereon. The user document parsing and structuring client 1020 includes a document uploading interface 1022, a document parsing interface 1024, and a document structuring interface 1026.

The server 1010 includes an unstructured document store 1040, a structured document store 1050, document structuring logic 1060, and document parsing logic 1070. The unstructured document store 1040 and structured document store 1050 can each comprise a database, memory, files (e.g., in a file system), and/or another data storage system. Alternatively, the unstructured document store 1040 and structured document store 1050 can share a database, memory, files (e.g., in a file system), and/or another data storage system. The document structuring logic 1060 and document parsing logic 1070 can each comprise hardware and/or software logic. In some embodiments, the document structuring logic 1060 and/or document parsing logic 1070 includes AI, machine learning, and/or other logic. In particular, the unstructured text is mapped to a structured version of the text, for the purposes of data processing, manipulation, and analytics.

Figure 11:
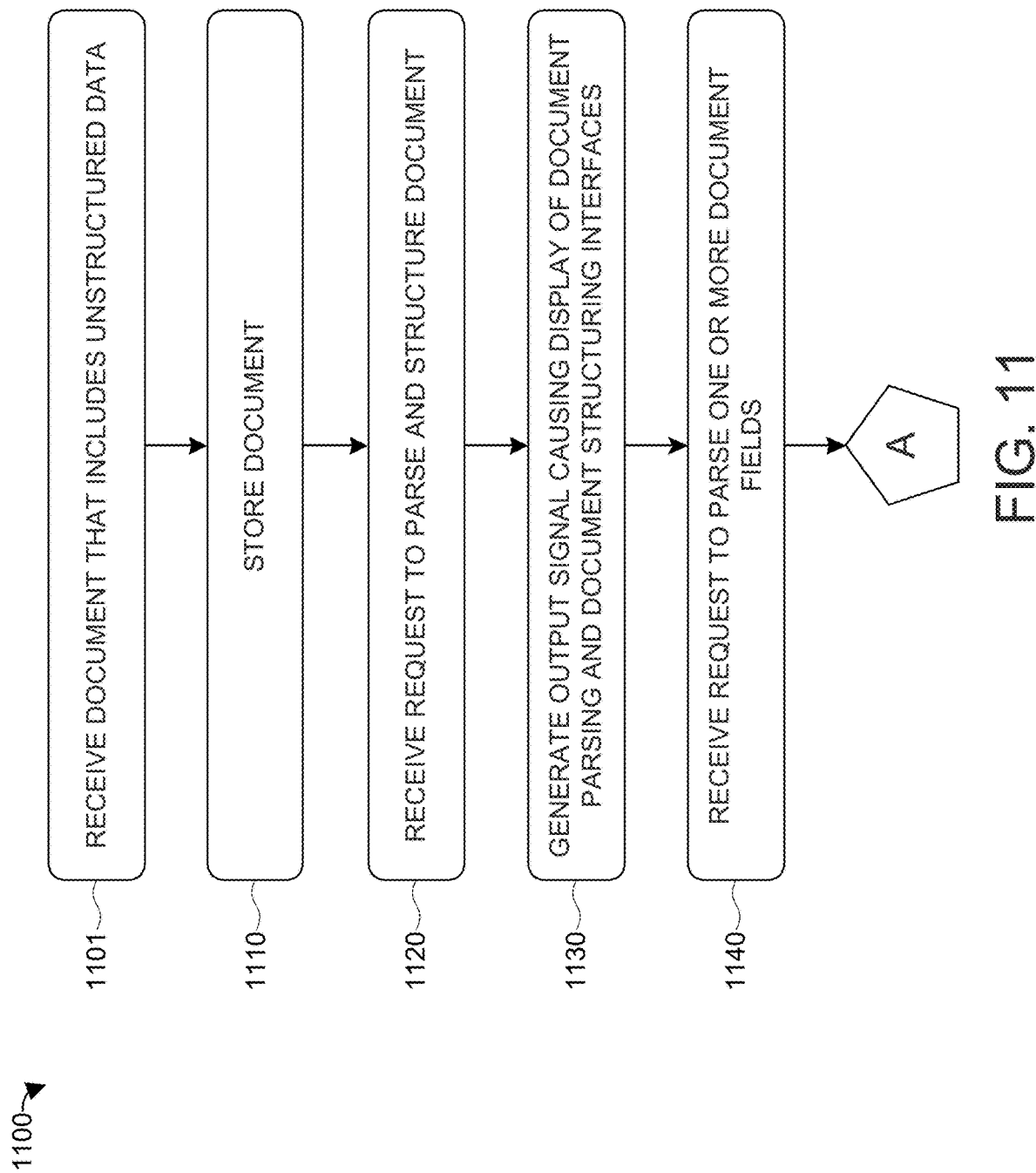
FIG. 11 is a flow chart of a method for parsing and structuring unstructured data according to an embodiment.
Figure 11:
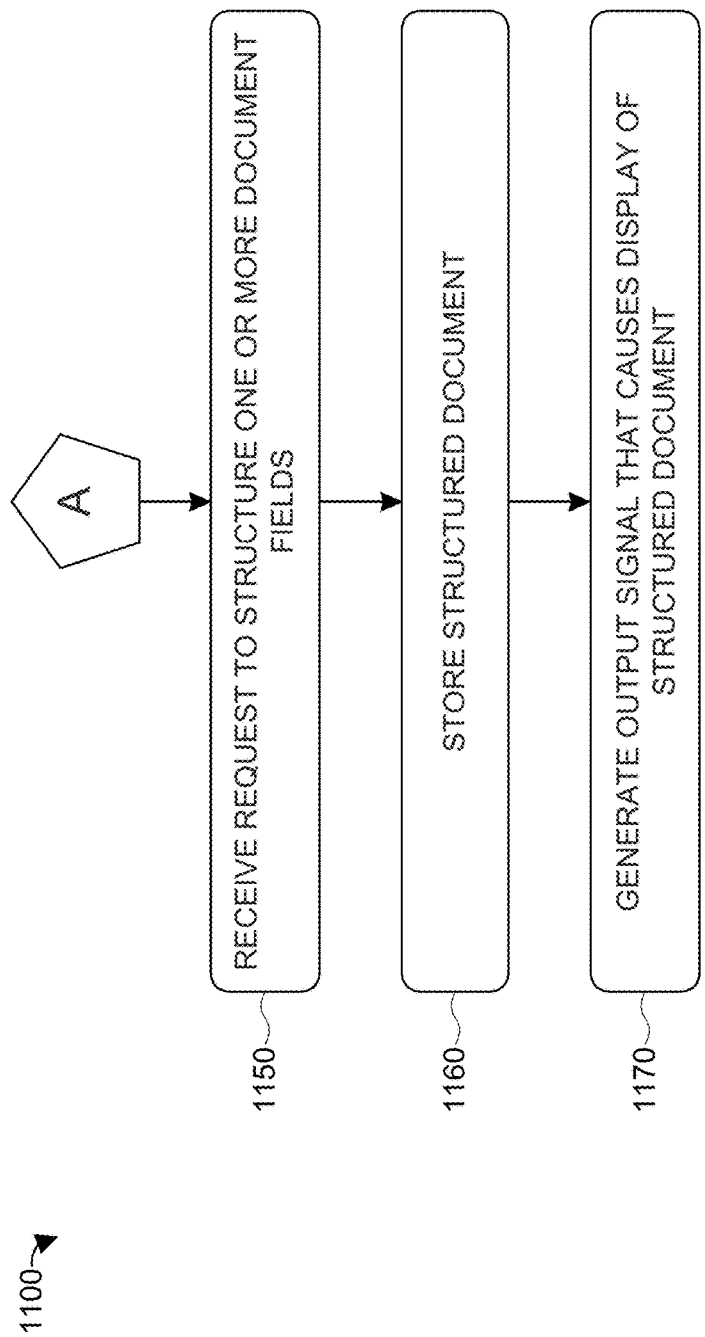

FIG. 11 is a flow chart 1100 of a method for parsing and structuring unstructured data according to an embodiment. In step 1100, the server 1010 receives a document or data (in general, a document) over a network connection such as the internet 1030. The document can include unstructured data, such as freeform text, numbers, and/or images. For example, the document can include text documents, PDF documents (images and/or text), document images (e.g., JPEGs), desktop screens, and/or browser data.

The document can be sent from the user's computer 1001 via the document uploading interface 1022. For example, the document can be stored in a local file that is transmitted (e.g., uploaded) from the computer 1001 to the server 1010. Alternatively, the document can be stored in a cloud-based file that is accessible on the computer 1001 via an application such as a web browser, a spreadsheet application (e.g., Microsoft Excel®), a word-processing application (e.g., Microsoft Word®), a PDF viewer/editor (e.g., Adobe Acrobat®), or another application that can access documents stored remotely. The cloud-based file can be saved locally to the computer 1001 and then transmitted to the server 1010. Alternatively, the user can "share" the cloud-based file with the server 1010 such as by granting permissions or access to the server 1010 or providing the user's credentials to the server 1010.

In step 1110, a copy of the document is stored in the memory of server 1010 such as in unstructured document store 1040.

In step 1120, the server 1010 receives a request to parse and structure the unstructured document (e.g., uploaded in step 1100). The request can be generated and sent by the computer 1001, for example based on one or more user inputs.

Figure 12:
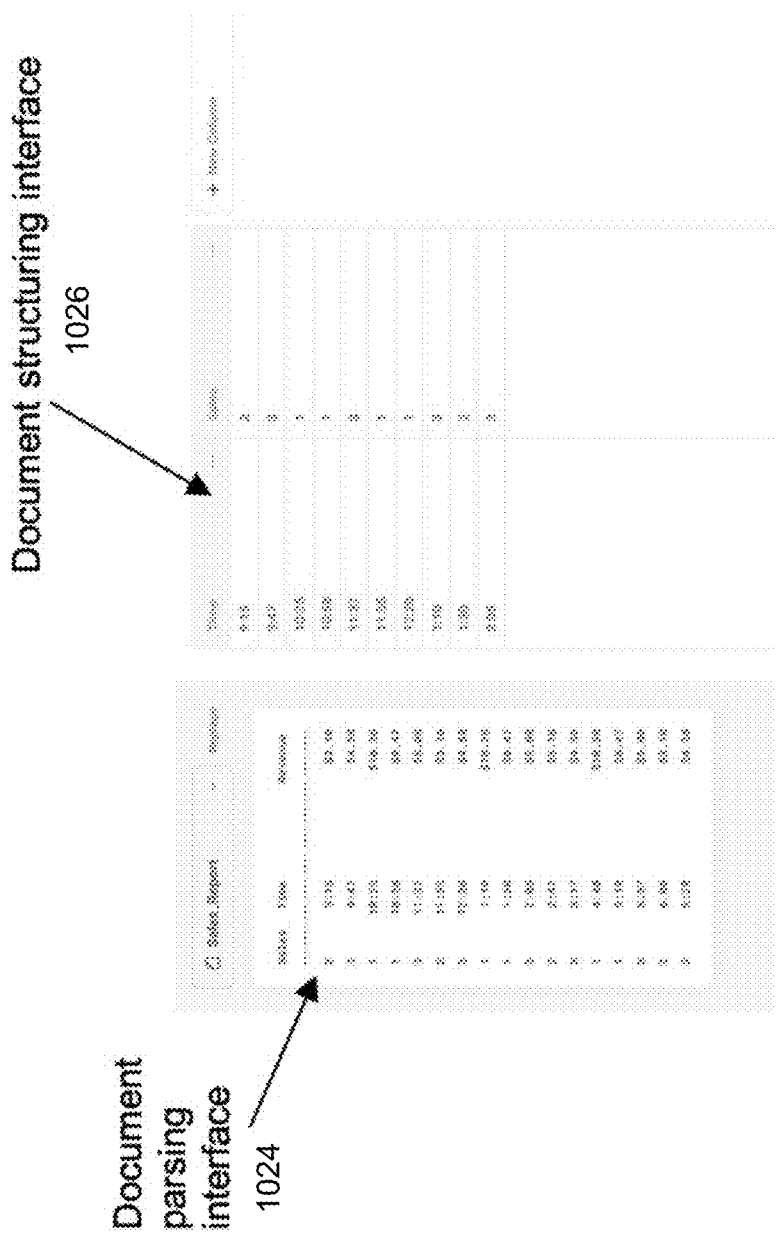
FIG. 12 illustrates an example of a document parsing interface and a document structuring interface.

In step 1130, the server 1010 generates an output signal that causes the computer 1001 to display the document parsing interface 1024 and/or the document structuring interface 1026 on the computer 1001. The document parsing interface 1024 and/or the document structuring interface 1026 can be displayed in a web browser application (e.g., if the document is accessed online) or in another application (e.g., in a word-processing application, for example as a plug in) if the document is accessed locally. The document parsing interface 1024 and/or the document structuring interface 1026 can comprise user interfaces that allow the user to drag and drop selected portions of the document to the corresponding interface. An example of the document parsing interface 1024 and the document structuring interface 1026 is illustrated in FIG. 12.

In step 1140, the server 1010 receives a request to parse one more document fields by loading the document in the document parsing interface and selecting, dragging, and dropping the document fields from the document parsing interface 1024 (e.g., on the user's browser application or other application/plug in running on computer 1001).

In step 1150 (via placeholder A), the server 1010 receives a request to structure one or more document fields and associated data/content by selecting, dragging, and dropping the document fields and associated data/content to a column in the document structuring interface 1026 (e.g., on the user's browser application or other application/plug in running on computer 1001), which can be named by the user. Step 1150 can be repeated for multiple sets of data within the document.

In step 1160, the server 1010 stores the structured document data, such as document fields (e.g., column names) and the mapping of the data/content to the document fields, in the structured data store 1050.

In step 1170, the server 1010 generates an output signal that causes the computer 1001 to display the structured document fields (e.g., column names) and the associated data/content in the document structuring interface 1026 (e.g., on the user's browser application or other application running on computer 1001).

The server 1010 can use document parsing logic 1060 and document structuring logic 1070 to "understand" the structure of the regions selected in steps 1140 and 1150. For example, the document parsing logic 1060 can be used to understand the semantic aspects of the selected regions and the document structuring logic 1070 can be used to understand the structural aspects of the selected regions.

The system 1000 and method 1100 can have various applications. An example application is document processing and data entry automation (e.g., mortgage intake forms, vendor contracts). For example, the system 1000 and method 1100 can be used to automatically populate a document with information from a database. Another example application is document fixing, such as detecting and fixing errors in documents. For example, the system 1000 and method 1100 can be used to compare a reported customer address and/or other information in a mortgage loan application with a stored customer address and/or other information in a database and flag discrepancies.

Yet another example application is document analytics. For example, the system 1000 and method 1100 can be used to process receipt data and flag expenses as fraudulent (or not fraudulent). In another example, the system 1000 and method 1100 can be used to process insurance contract data (for healthcare providers) and detecting discrepancies between what insurance should be paying, and what insurance has actually been paying. In another example, system 1000 and method 1100 can be used to build reports and dashboards on top of document data.

The present invention should not be considered limited to the particular embodiments described above. Various modifications, equivalent processes, as well as numerous structures to which the present invention may be applicable, will be readily apparent to those skilled in the art to which the present invention is directed upon review of the present disclosure. The above-described embodiments may be implemented in numerous ways. One or more aspects and embodiments involving the performance of processes or methods may utilize program instructions executable by a device (e.g., a computer, a processor, or other device) to perform, or control performance of, the processes or methods.

In this respect, various inventive concepts may be embodied as a non-transitory computer readable storage medium (or multiple non-transitory computer readable storage media) (e.g., a computer memory of any suitable type including transitory or non-transitory digital storage units, circuit configurations in Field Programmable Gate Arrays or other semiconductor devices, or other tangible computer storage medium) encoded with one or more programs that, when executed on one or more computers or other processors, perform methods that implement one or more of the various embodiments described above. When implemented in software (e.g., as an app), the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more communication devices, which may be used to interconnect the computer to one or more other devices and/or systems, such as, for example, one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, a computer may have one or more input devices and/or one or more output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

The non-transitory computer readable medium or media may be transportable, such that the program or programs stored thereon may be loaded onto one or more different computers or other processors to implement various one or more of the aspects described above. In some embodiments, computer readable media may be non-transitory media.

The terms "program," "app," and "software" are used herein in a generic sense to refer to any type of computer code or set of computer-executable instructions that may be employed to program a computer or other processor to implement various aspects as described above. Additionally, it should be appreciated that, according to one aspect, one or more computer programs that when executed perform methods of the present application need not reside on a single computer or processor, but may be distributed in a modular fashion among a number of different computers or processors to implement various aspects of the present application.

Computer-executable instructions may be in many forms, such as program modules, executed by one or more computers or other devices. Generally, program modules include routines, programs, objects, components, data structures, etc. that performs particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Thus, the present disclosure and claims include new and novel improvements to existing methods and technologies, which were not previously known nor implemented to achieve the useful results described above. Users of the present method and system will reap tangible benefits from the functions now made possible on account of the specific modifications described herein causing the effects in the system and its outputs to its users. It is expected that significantly improved operations can be achieved upon implementation of the claimed invention, using the technical components recited herein.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A computer-implemented method for automatically determining data relationships, comprising:
   generating, with the computer, a graphical user interface (GUI);
   receiving, at the computer, a first user input on the GUI to generate first and second data source icons on the GUI, the first and second data source icons representing respective data sources of raw data sets to import to the computer;
   automatically importing, to the computer, the raw data sets from the respective data sources;
   automatically performing a cleaning operation on each raw data set, the cleaning operation including:
      automatically modeling each raw data set with a data-set model;
      automatically identifying one or more apparent errors in at least one of the raw data sets compared to a respective one or more expected values from the data-set model; and
      automatically suggesting a respective replacement data value, using the data-set model, for each of the one or more apparent errors;
   receiving, at the computer, a second user input on the GUI to graphically connect an input side of a merge icon on the GUI to respective output sides of the first and second data source icons, the merge icon causing the computer to automatically merge the raw data sets to form a merged data set, the merged data set including multiple data set variables;
   receiving, at the computer, a third user input on the GUI to graphically connect an output side of the merge icon to an input side of a data set variable selection icon on the GUI, the data set selection icon including a graphical user input to identify selected data set variables from the multiple data set variables;
   receiving, at the computer, a fourth user input on the GUI to graphically connect an output side of the data set variable selection icon to an input side of a build model icon on the GUI, the build model icon causing the computer to automatically build a customized model using the selected data set variables and respective data, wherein the computer is configured to build the customized model without any additional input from the user;
   automatically generating, with the computer, a graphical representation of the selected data set variables using the customized model;
   receiving, at the computer, a first prediction user interface input that corresponds to a first customized weight of a first selected data set variable in the customized model;
   automatically setting the first customized weight of the first selected data set variable in the customized model to determine first predicted data;
   automatically generating, with the computer, a graphical representation of the first predicted data;
   receiving, at the computer, a second prediction user interface input that corresponds to a second customized weight of a second selected data set variable in the customized model;
   automatically setting the second customized weight of the second selected data set variable in the customized model to determine second predicted data;
   automatically generating, with the computer, a graphical representation of the second predicted data; and
   sending an output signal from the computer to a client computer that causes the client computer to simultaneously display the graphical representation of the customized model, the graphical representation of the first predicted data, and the graphical representation of the second predicted data.

2. The method of claim 1, further comprising sending an output signal to multiple client computers that causes each client computer to display the GUI.

3. The method of claim 2, wherein the computer receives at least one of the first user input, the second user input, the third user input, or the fourth user input from different client computers.

4. The method of claim 1, further comprising receiving, at the computer, a fifth user input on the GUI to connect an output side of the build model icon to an input side of a data prediction icon on the GUI, the data prediction icon causing the computer to automatically determine predicted data using the customized model.

5. A computer for determining data relationships, comprising:
   a processor; and
   non-volatile memory operatively coupled to the processor, the non-volatile memory storing computer-readable instructions that, when executed by the processor, cause the processor to:
   generate a graphical user interface (GUI);
   receive a first user input on the GUI to generate first and second data source icons on the GUI, the first and second data source icons representing respective data sources of raw data sets to import to the computer;

automatically import the raw data sets from the respective data sources;

automatically perform a cleaning operation on each raw data set, the cleaning operation including:
  automatically model each raw data set with a data-set model;
  automatically identify one or more apparent errors in at least one of the raw data sets compared to a respective one or more expected values from the data-set model; and
  automatically suggest a respective replacement data value, using the data-set model, for each of the one or more apparent errors;

receive a second user input on the GUI to graphically connect an input side of a merge icon on the GUI to respective output sides of the first and second data source icons, the merge icon causing the processor to automatically merge the raw data sets to form a merged data set, the merged data set including multiple data set variables;

receive a third user input on the GUI to graphically connect an output side of the merge icon to an input side of a data set variable selection icon on the GUI, the data set selection icon including a graphical user input to identify selected data set variables from the multiple data set variables;

receive a fourth user input on the GUI to graphically connect an output side of the data set variable selection icon to an input side of a build model icon on the GUI, the build model icon causing the processor to automatically build a customized model using the selected data set variables and respective data, wherein the computer is configured to build the customized model without require any additional input from the user;

automatically generate a graphical representation of the selected data using the customized models;

receive a first prediction user interface input that corresponds to a first customized weight of a first selected data set variable in the customized model;

automatically set the first customized weight of the first selected data set variable in the customized model to determine first predicted data;

automatically generate a graphical representation of the first predicted data;

receive a second prediction user interface input that corresponds to a second customized weight of a second selected data set variable in the customized model;

automatically set the second customized weight of the second selected data set variable in the customized model to determine second predicted data;

automatically generate a graphical representation of the second predicted data; and send an output signal to a client computer that causes the client computer to simultaneously display the graphical representation of the customized model, the graphical representation of the first predicted data, and the graphical representation of the second predicted data.

6. A system for determining data relationships, comprising:
a server comprising:
  a server processor; and
  non-volatile server memory operatively coupled to the server processor, the non-volatile server memory storing computer-readable instructions that, when executed by the server processor, cause the server processor to:

generate a graphical user interface (GUI);

receive a first user input on the GUI to generate first and second data source icons on the GUI, the first and second data source icons representing respective data sources of raw data sets to import to the computer;

automatically import the raw data sets from the respective data sources;

automatically perform a cleaning operation on each raw data set, the cleaning operation including:
  automatically model each raw data set with a data-set model;
  automatically identify one or more apparent errors in at least one of the raw data sets compared to a respective one or more expected values from the data-set model; and
  automatically suggest a respective replacement data value, using the data-set model, for each of the one or more apparent errors;

receive a second user input on the GUI to graphically connect an input side of a merge icon on the GUI to respective output sides of the first and second data source icons, the merge icon causing the server processor to automatically merge the raw data sets to form a merged data set, the merged data set including multiple data set variables;

receive a third user input on the GUI to graphically connect an output side of the merge icon to an input side of a data set variable selection icon on the GUI, the data set selection icon including a graphical user input to identify selected data set variables from the multiple data set variables;

receive a fourth user input on the GUI to graphically connect an output side of the data set variable selection icon to an input side of a build model icon on the GUI, the build model icon causing the server processor to automatically build a customized model using the selected data set variables and respective data, wherein the server is configured to build the customized model without any additional input from the user;

automatically generate a graphical representation of the data set variables using the customized model;

receive a first prediction user interface input that corresponds to a first customized weight of a first selected data set variable in the customized model;

automatically set the first customized weight of the first selected data set variable in the customized model to determine first predicted data;

automatically generate a graphical representation of the first predicted data;

receive a second prediction user interface input that corresponds to a second customized weight of a second selected data set variable in the customized model;

automatically set the second customized weight of the second selected data set variable in the customized model to determine second predicted data;

automatically generate a graphical representation of the second predicted data; and send an output signal to a client computer that causes the client computer to simultaneously display the graphical representation of the customized model, the graphical representation of the first predicted data, and the graphical representation of the second predicted data; and the client computer comprising:

a client processor; and non-volatile client memory operatively coupled to the client processor, the non-volatile client memory storing computer-readable instructions that, when executed by the client processor, cause the client processor to:

display the GUI on a display coupled to the client computer;

send the first, second, third, and fourth user inputs to the server;

send the first and second prediction user interface inputs to the server;

display the graphical representation of the dataset variables using the customized model on the display;

display the graphical representation of the first predicted data on the display;

display the graphical representation of the second predicted data on the display; and simultaneously display the graphical representation of the customized model, the graphical representation of the first predicted data, and the graphical representation of the second predicted data on the display.

* * * * *